(12) United States Patent
Agrawal et al.

(10) Patent No.: US 12,346,204 B2
(45) Date of Patent: Jul. 1, 2025

(54) ACCELERATED FATAL SYSTEM ERROR RECOVERY OF CONTAINER HOST

(71) Applicant: Microsoft Technology Licensing, LLC, Redmond, WA (US)

(72) Inventors: Shekhar Agrawal, Kirkland, WA (US); Abhay Sudhir Ketkar, Redmond, WA (US); Gaurav Jagtiani, Kirkland, WA (US); Binit Ranjan Mishra, Kenmore, WA (US); Emma Sutherland Boyd, Richmond, VA (US); Scott Chao-Chueh Lee, Bellevue, WA (US); James Anthony Schwartz, Jr., Seattle, WA (US); Hari R. Pulapaka, Redmond, WA (US); Karan Mehra, Sammamish, WA (US); Shailesh Padmakar Joshi, Telangana (IN); Jason Stewart Wohlgemuth, Seattle, WA (US); David Wimmel, Cincinnati, OH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 18/343,035

(22) Filed: Jun. 28, 2023

(65) Prior Publication Data
US 2025/0004882 A1    Jan. 2, 2025

(51) Int. Cl.
*G06F 11/30*    (2006.01)
*G06F 11/07*    (2006.01)
*G06F 11/14*    (2006.01)

(52) U.S. Cl.
CPC .......... *G06F 11/1415* (2013.01); *G06F 11/07* (2013.01); *G06F 11/302* (2013.01)

(58) Field of Classification Search
CPC ................. G06F 11/1415; G06F 11/07; G06F 11/0778; G06F 11/0766; G06F 11/302
See application file for complete search history.

(56) References Cited

U.S. PATENT DOCUMENTS

| | | | |
|---|---|---|---|
| 2015/0312087 A1* | 10/2015 | Terwilliger | G06F 11/00 455/41.1 |
| 2017/0199770 A1* | 7/2017 | Peteva | G06F 9/5088 |
| 2019/0056985 A1* | 2/2019 | Farkas | G06F 9/45558 |
| 2021/0011749 A1* | 1/2021 | Kanakeshan | G06F 9/45558 |

FOREIGN PATENT DOCUMENTS

CN    114911577 A  *  8/2022  ......... G06F 9/45558

* cited by examiner

*Primary Examiner* — Yolanda L Wilson
(74) *Attorney, Agent, or Firm* — Workman Nydegger (57) ABSTRACT

A computer system identifies an event from a management system log associated with a first container host. The presence of the event in the management system log is indicative that the first container host identified a fatal system error at the first container host. Based on the event, the computer system determines that a first instance of a container that is provisioned at the first container host has been isolated to the first container host. Based on the first instance of the container having been isolated to the first container host, the computer system instructs a second container host to provision a second instance of the container at the second container host.

20 Claims, 3 Drawing Sheets

ACCELERATED FATAL SYSTEM ERROR RECOVERY OF CONTAINER HOST

BACKGROUND

In computing, a fatal system error (also known as a system crash, stop error, kernel error, or bug check) occurs when an operating system (OS) halts because it has reached a condition where it can no longer operate safely (e.g., where critical data could be lost, or the system damaged in other ways). Fatal system errors are often the result of a severe software-level or hardware-level problem (e.g., hardware issues, firmware issues, kernel bugs, driver bugs, user-mode misbehaviors) that compromises safe system operation. If the OS continues to run after its integrity is compromised, it could corrupt data or compromise the system's security. To protect from data loss after a fatal system error, the OS halts running processes and restarts the computer.

No OS is immune from encountering fatal system errors. This includes server-focused OSs, such as host OSs at container host computer systems (container hosts). Container hosts may host workloads (e.g., tenant workloads) using containers that rely on hypervisor-created virtual machines that emulate the functionality of a physical hardware or computing system to execute a guest OS. Example hypervisor technologies include HYPER-V (WINDOWS), VMWARE (multiple OSs), Kernel-based Virtual Machine (LINUX), and BHYVE (FREEBSD). Additionally, or alternatively, container hosts may host workloads using containers that rely on OS-level virtualization, in which a single OS kernel allows the existence of multiple isolated user-space OS instances. Example OS-level virtualization technologies include DOCKER (multiple OSs), LINUX Containers (LINUX), zones (SOLARIS), and jails (FREEBSD).

Because a typical fatal system error leads to an OS crash and a system reboot, a fatal system error at the host OS of a container host can cause significant disruptions to workloads before the containers hosting those workloads can be recreated and resumed following the system reboot. This is particularly true on the server-class hardware typically used for container hosts, in which a system reboot may involve a lengthy reset of the server firmware and any attached devices (e.g., drive arrays and network interface cards). In many cases, following a host OS encountering a fatal system error on a container host, and a resulting firmware reset, there could be a "blackout time" for workloads of up to thirty minutes or more before completing the resumption of a container hosting a workload.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: identifying an event from a management system log associated with a first container host, wherein the presence of the event in the management system log is indicative that the first container host identified a fatal system error at the first container host; determining that a first instance of a container that is provisioned at the first container host has been isolated to the first container host; and instructing a second container host to provision a second instance of the container at the second container host.

In some aspects, the techniques described herein relate to methods, systems, and computer program products, including identifying an event from a management system log associated with a first container host, wherein the presence of the event in the management system log is indicative that the first container host identified a fatal system error at the first container host; isolating a first instance of a container that is provisioned at the first container host; and instructing a second container host to provision a second instance of the container at the second container host.

In some aspects, the techniques described herein relate to methods, systems, and computer program products, including identifying an occurrence of a fatal system error in connection with the execution of an instruction by the processor system; and based on identifying the occurrence of the fatal system error: initiating network isolation of an instance of a container that is provisioned at the computer system; initiating writing of a memory dump to persistent storage; and initiating writing of an event to a management system log.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

In some situations, before restarting a container host after its host operating system (OS) has encountered a fatal system error, the host OS persists (e.g., to local persistent storage, to a network location) a "memory dump" (often referred to as a crash dump) containing all, or part, of the container host's memory contents. A memory dump can include kernel-mode memory contents (e.g., a kernel-mode dump file), user-mode memory contents (e.g., a user-mode dump file), and combinations thereof. Memory dumps are a powerful and valuable tool for troubleshooting, diagnostics, and identifying and fixing hardware and software bugs. However, given contemporary memory capacities, particularly on server-class hardware typically used for container hosts, persisting memory dumps can take considerable time.

After a container host has encountered a fatal system error, the container host attempts to cease execution of any container instances executing thereon. However, due to the occurrence of the fatal system error, the container host is in a degraded (e.g., unknown, unstable) state. Thus, this degraded container host cannot be relied upon to guarantee that an instance of a container that was operating at the degraded container host at the time of the fatal system error will not continue operating while the degraded container host persists a memory dump. This means that if a control plane "service heals" the container by provisioning another instance of the container at another container host while the degraded container host persists a memory dump, there is a non-zero chance that there could be two concurrently operating instances of the container, which can lead to data corruption. Thus, a control plane that manages the provisioning of containers across container hosts needs to either prioritize gathering of memory dumps to the detriment of workloads (e.g., tenant workloads) by waiting for a degraded container host to persist a memory dump and reboot before service healing any containers operating thereon, or prioritize service healing and workloads to the detriment of the gathering of memory dumps by rebooting degraded container hosts without first persisting a memory dump. Either option is unsatisfactory because it either negatively affects the gathering of valuable diagnostic data or negatively impacts workloads.

At least some embodiments described herein overcome this tradeoff by providing isolation guarantees for containers operating at degraded container hosts. This enables a control plane to service heal any containers that were operating at a degraded container host before the degraded container host has completed the persisting of a memory dump. Thus, the embodiments described herein provide for an accelerated fatal system error recovery of container hosts that prioritizes both the gathering of valuable diagnostic data and service healing of containers and the workloads executing thereon.

Figure 1:
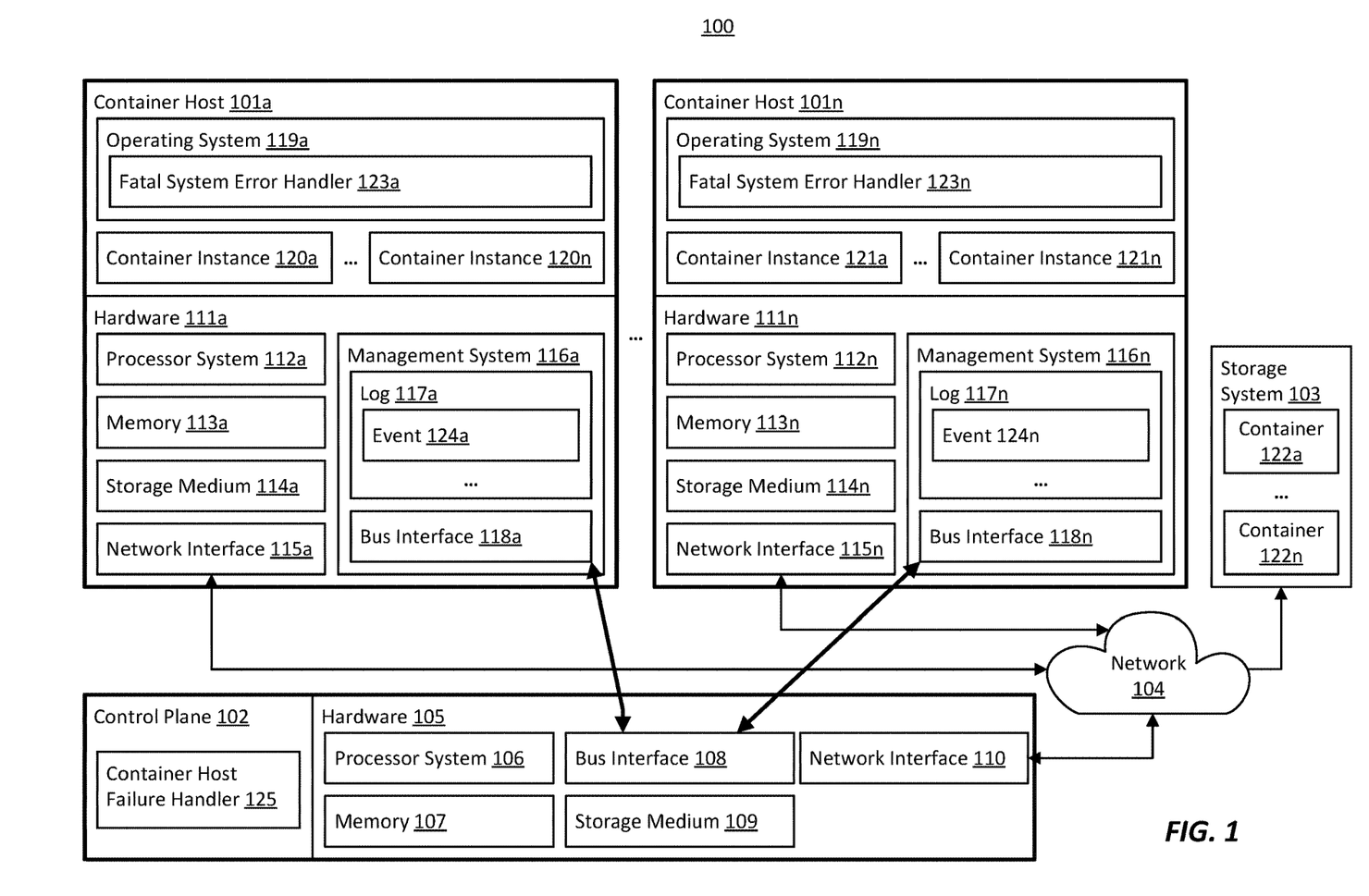
FIG. 1 illustrates an example of a computer system that facilitates accelerated fatal system error recovery of a container host.

FIG. 1 illustrates an example of a computer system 100 that facilitates accelerated fatal system error recovery of a container host. As shown, computer system 100 includes a plurality of computer systems, including a plurality of container host computer systems (e.g., container host 101a to container host 101n, collectively, container hosts 101), a control plane computer system (control plane 102), and a storage system 103. Each computer system illustrated in FIG. 1 includes corresponding computing hardware, such as hardware 105 at the control plane 102 and hardware 111a to hardware 111n at container hosts 101. For brevity, FIG. 1 does not expressly illustrate hardware for storage system 103.

For each computer system illustrated in FIG. 1, its corresponding computing hardware comprises a processor system, such as processor system 106 at the control plane 102 and processor system 112a to processor system 112n at container hosts 101. In embodiments, each processor system comprises a single processor or a plurality of processors. For each computer system illustrated in FIG. 1, its corresponding computing hardware also comprises a corresponding memory, such as memory 107 at the control plane 102 and memory 113a to memory 113n at container hosts 101. In embodiments, each memory is a system or main memory. For each computer system illustrated in FIG. 1, its corresponding computing hardware also comprises a corresponding storage medium, such as storage medium 109 at the control plane 102 and storage medium 114a to storage medium 114n at container hosts 101. In embodiments, each illustrated storage medium represents a single computer-readable storage medium or a plurality of computer-readable storage media. For each computer system illustrated in FIG. 1, its corresponding computing hardware also comprises a corresponding network interface, such as network interface 110 at the control plane 102 and network interface 115a to network interface 115n at container hosts 101. Using these network interfaces, these computer systems are interconnected via a network 104.

Referring specifically, to container hosts 101, in embodiments, the computing hardware of each container host comprises a corresponding management system (e.g., management system 116a to management system 116n, collectively, management systems 116). In embodiments, management systems 116 each represent a baseboard management controller (BMC) that operates according to the Intelligent Platform Management Interface (IPMI) specification or similar technology. The IPMI specification defines an autonomous computer subsystem and communications protocol that provides management and monitoring capabilities independently of a computer's central processing unit (CPU) and a host OS executing thereon. A BMC is a microcontroller (e.g., embedded on the computer's motherboard) that provides intelligence for the IPMI subsystem. Among other things, a BMC typically provides capabilities to monitor the computer system's hardware via sensors, to flash the computer system's BIOS/UEFI firmware, to give remote console access (e.g., via serial access, or via virtual keyboard, video, mouse), to power cycle the computer system, and to log events. As shown in FIG. 1, each management system of management systems 116 includes a corresponding log (e.g., a log 117a at management system 116a of container host 101a to a log 117n at management system 116n of container host 101n, collectively, logs 117).

In FIG. 1, the hardware of each container host of container hosts 101 and the hardware of control plane 102 each includes a corresponding bus interface (e.g., bus interface 118a at hardware 111a of container host 101a, bus interface 118n at hardware 111n of container host 101n, bus interface 108 at hardware 105 of control plane 102). Examples of bus interfaces include a serial interface, a UNIVERSAL SERIAL BUS (USB) interface, a THUNDERBOLT interface, and the like. As shown in FIG. 1, these bus interfaces enable direct communication between container hosts 101 and control plane 102. Referring to hardware 111a and hardware 111n, bus interface 118a and bus interface 118n are illustrated as being associated with management system 116a and management system 116n, respectively. This is to indicate that these bus interfaces enable control plane 102 to communicate directly with management systems 116, for example, to access logs 117.

In embodiments, each container host of container hosts 101 hosts one or more container instances, and control plane 102 orchestrates the provisioning of containers (e.g., container 122a to container 122n stored at the storage system 103) to container hosts 101. Thus, container host 101a is illustrated as including container instance 120a to container instance 120n (collectively, container instances 120), while container host 101b is illustrated as including container instance 121a to container instance 121n (collectively, container instances 121). In embodiments, each container instance is a hypervisor-created virtual machine (VM) (e.g., HYPER-V, VMWARE, kernel-based VM, BHYVE) or an OS-level virtualized container (e.g., DOCKER, LINUX Container, zone, jail).

In embodiments, control plane 102 ensures that container hosts 101 collectively host only a single instance of any given container at one time. Thus, in the example of FIG. 1, there is no overlap between the containers represented by container instances 120 and container instances 121. To further illustrate, when control plane 102 initiates the provisioning of container 122a at container host 101a as container instance 120a, control plane 102 ensures that container 122a is not provisioned at container host 101n (or any other container host). Similarly, when control plane 102 initiates the provisioning of container 122n at container host 101n as container instance 121a, control plane 102 ensures that container 122n is not provisioned at container host 101a (or any other container host).

Each container host of container hosts 101 includes a corresponding OS (e.g., OS 119a at container host 101a to OS 119n at container host 101n), which each includes a fatal system error handler (e.g., fatal system error handler 123a at container host 101a to fatal system error handler 123n at container host 101n, collectively, fatal system error handler 123). In embodiments, each fatal system error handler 123 detects a fatal system error at its container host and takes remedial action for the fatal system error. In embodiments, this includes persisting a memory dump and creating an event (events 124) in the container host's management system log (e.g., based on IPMI communication with the container host's management system). For example, when container host 101a encounters a fatal system error, fatal system error handler 123a persists a dump of all or part of memory 113a (e.g., to storage medium 114a) and writes event 124a to log 117a (e.g., based on IPMI communication with management system 116a). Similarly, when container host 101n encounters a fatal system error, fatal system error handler 123n persists a dump of all or part of memory 113n (e.g., to storage medium 114n) and writes event 124n to log 117n (e.g., based on IPMI communication with management system 116n). In embodiments, events 124 are of a type that indicates that fatal system error handler 123 has placed the container host into a single process, single processor mode for persisting a memory dump. In some embodiments, events 124 also indicate that fatal system error handler 123 has taken affirmative action to ensure network isolation of any containers provisioned thereon.

In FIG. 1, control plane 102 includes a container host failure handler 125. In embodiments, container host failure handler 125 monitors the logs 117 at container hosts 101 for the presence of events 124. In embodiments, when container host failure handler 125 identifies an event of the type of events 124 at a given container host, container host failure handler 125 initiates an accelerated fatal system error recovery of that container host, which prioritizes both the persisting of a memory dump by that container host, as well as accelerated service healing of containers provisioned to the container host.

Figure 2:
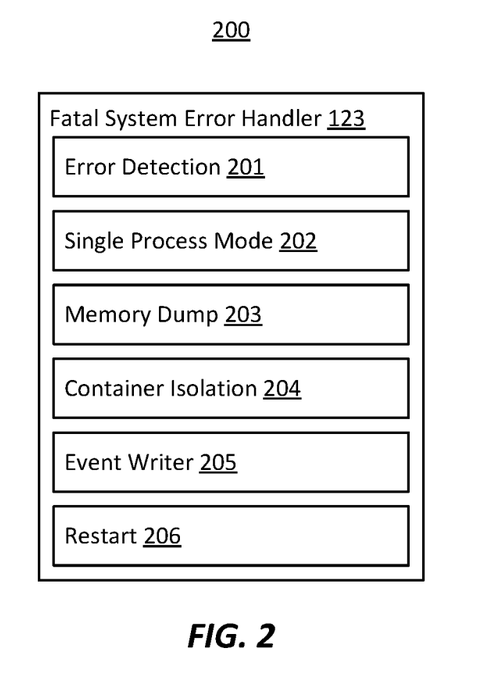
FIG. 2 illustrates an example of a fatal system error handler of a container host.
Figure 3:
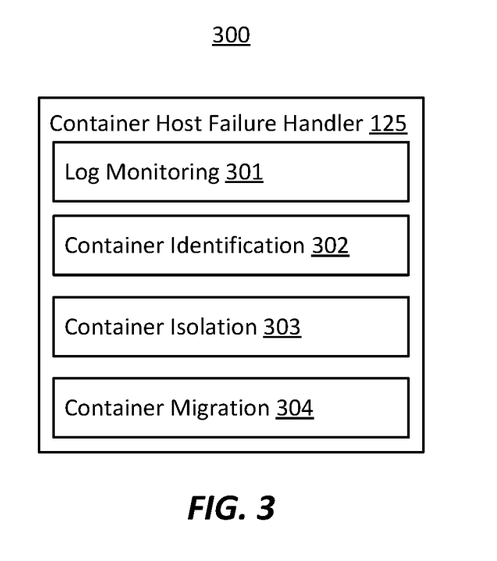
FIG. 3 illustrates an example of a container host failure hander of a control plane.

FIG. 2 illustrates an example 200 showing example components of fatal system error handler 123. Additionally, FIG. 3 illustrates an example 300 showing example components of container host failure handler 125. Each depicted component of fatal system error handler 123 and container host failure handler 125 represents various functionalities that fatal system error handler 123 and container host failure handler 125 may implement under the embodiments described herein. These components—including their identity and arrangement—are presented merely as an aid in describing example embodiments of fatal system error handler 123 and container host failure handler 125.

Example 200 is now described within the context of fatal system error handler 123a and container host 101a. However, this description is applicable to each container host of container hosts 101 and their corresponding fatal system error handlers. In example 200, fatal system error handler 123 is illustrated as including an error detection component 201 that detects the occurrence of a fatal system error. When a processing unit of processor system 112a encounters an error that prevents that processing unit from proceeding (e.g., due to an invalid memory pointer, due to an invalid software interrupt), that processing unit initiates a callback to error detection component 201, which detects the occurrence of a fatal system error.

Fatal system error handler 123 also includes a single process mode component 202 that initiates a single process mode at container host 101a for persisting a dump of memory 113a (e.g., to storage medium 114a) after a fatal system error detection by error detection component 201. In embodiments, initiating the single process mode includes single process mode component 202 comprises freezing all processing units at processor system 112a other than the one that encountered the fatal system error. In embodiments, initiating the single process mode includes single process mode component 202 suspending or terminating all processes managed by OS 119a, except for a process that is responsible for persisting the memory dump (e.g., a process corresponding to a memory dump component 203).

In some embodiments, fatal system error handler 123 also includes a container isolation component 204 that isolates any containers at container host 101a. For example, container isolation component 204 ensures that no network activity generated by container instances 120 can egress from network interface 115a after the operation of container isolation component 204. In some embodiments, container isolation component 204 delays a further action (e.g., event writer component 205) until sufficient time has passed that any in-flight network activity has been drained by network interface 115a. In some embodiments, container isolation component 204 proactively cancels in-flight network activity at network interface 115a. In some embodiments, container isolation component 204 deactivates network interface 115a.

Fatal system error handler 123 also includes an event writer component 205 that writes event 124a to log 117a (e.g., based on IPMI communication with management system 116a). In embodiments, event writer component 205 writes event 124a only after it would be safe for container host failure handler 125 to initiate a service healing of container instances 120 to another container host. For example, in some embodiments (e.g., which lack container isolation component 204), event writer component 205 writes event 124a after the operation of single process mode component 202. In some embodiments, event writer component 205 writes event 124a only after the operation of container isolation component 204. In embodiments, event writer component 205 writes event 124a prior to the completion of memory dump component 203. Fatal system error handler 123 also includes a restart component 206 that restarts container host 101a (e.g., by restarting processor system 112a) after completion of memory dump component 203.

Referring now to example 300, container host failure handler 125 includes a log monitoring component 301 that monitors logs 117 at container hosts 101 for the presence of events 124. For example, container host failure handler 125 uses bus interface 108 to interface with management systems 116 to monitor the logs 117. In some embodiments, container host failure handler 125 polls each management system of management systems 116. In other embodiments, container host failure handler 125 subscribes to notifications from management systems 116. When log monitoring component 301 identifies one of events 124 (e.g., event 124a), log monitoring component 301 triggers an accelerated service healing at the degraded container host (e.g., container host 101a) at which the event was identified.

Container host failure handler 125 also includes a container identification component 302 that determines which containers(s) were provisioned to the degraded container host. For example, after identifying event 124a in log 117a, container identification component 302 identifies container instances 120. In embodiments, because control plane 102 manages the provisioning of containers among container hosts 101, container identification component 302 maintains a record of which containers are provisioned to each container host, and container identification component 302 refers to this record.

Container host failure handler 125 also includes a container isolation component 303 that determines if the container(s) (e.g., container instances 120) provisioned to the degraded container host (e.g., container host 101a) have been isolated. In some embodiments, such as when fatal system error handler 123 includes container isolation component 204, the mere presence of one of events 124 in a container host's management system log indicates that that container host has isolated its containers. In some embodiments, container isolation component 303 determines that the containers at the degraded container host have been isolated in some other way, such as by the disabling of a port at a network switch (e.g., part of network 104) to which the degraded container host is connected, by the disabling of a network interface at the degraded container host (e.g., when the network interface is a "smart" network interface card), by the termination (e.g., by a firewall of network 104) of network states associated with the degraded container host. In some embodiments, whether or not fatal system error handler 123 includes container isolation component 204, container isolation component 303 takes proactive action to isolate containers at the degraded container host. In embodiments, this proactive action includes disabling a port at a network switch to which the degraded container host is connected, disabling a network interface at the degraded container host, terminating network states associated with the degraded container host, and the like.

Container host failure handler 125 also includes a container migration component 304 that provisions the container(s) of the degraded container host to one or more other container hosts once the operation of container isolation component 303 has been completed.

Embodiments are now described in connection with FIG. 4, which illustrates a flow chart of an example method 400 for accelerated fatal system error recovery of a container host. In embodiments, instructions for implementing method 400 are encoded as computer-executable instructions (e.g., fatal system error handler 123, container host failure handler 125) stored on a computer storage medium (e.g., storage medium 114a, 114n, 109) that are executable by a processor system (e.g., processor system 112a, 112n, 106) to cause a computer system (e.g., computer system 100) to perform method 400.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Figure 4:
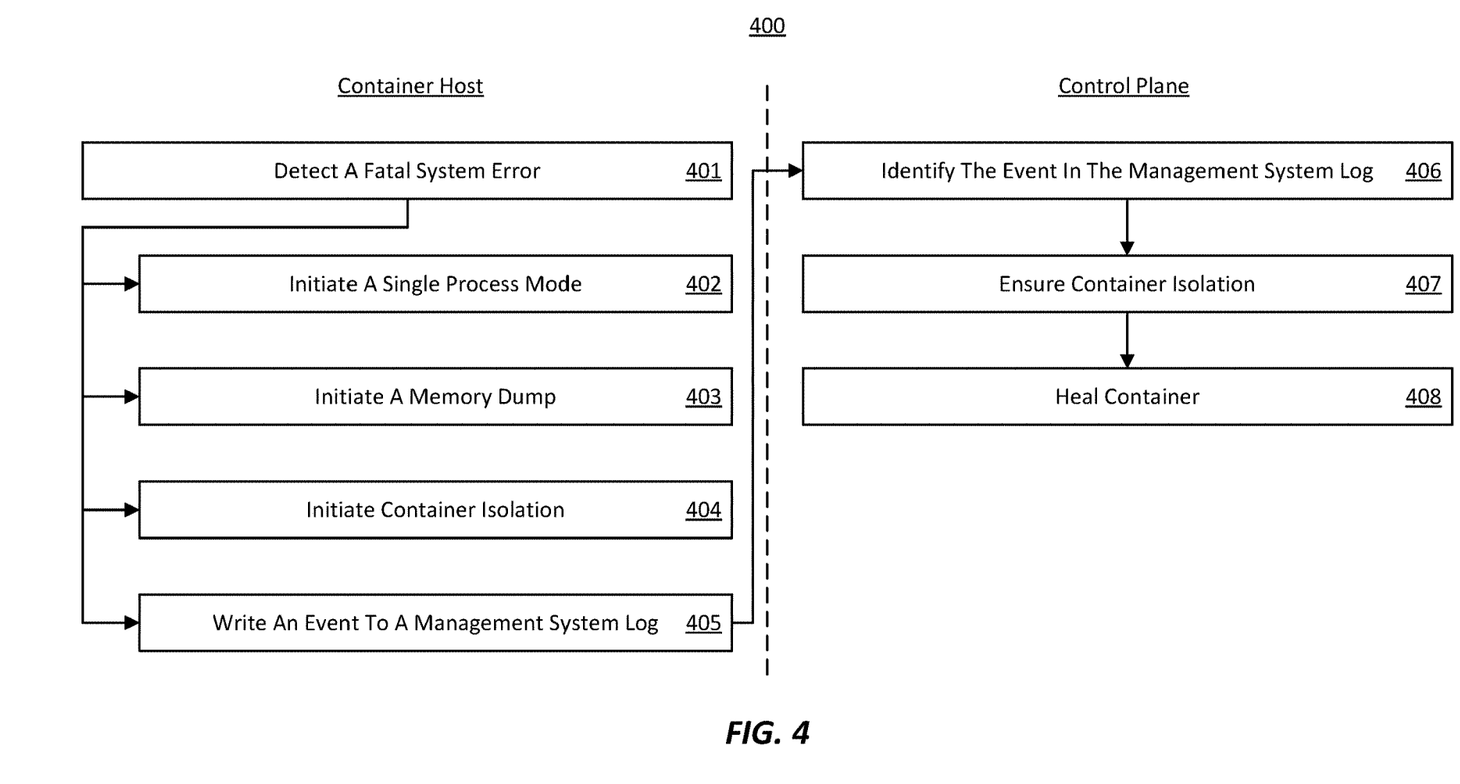
FIG. 4 illustrates a flow chart of an example of a method for accelerated fatal system error recovery of a container host.

As shown in FIG. 4, method 400 comprises acts (e.g., act 401 to act 405) performed by a container host (e.g., one of the container hosts 101) and acts (e.g., act 406 to act 408) performed by a control plane (e.g., control plane 102). In some embodiments, method 400 is implemented as a single method performed by a computer system comprising control plane 102 and one more of container hosts 101 (e.g., container host 101a). In other embodiments, method 400 is implemented as two methods, a first (e.g., one or more of act 401 to act 405) performed by fatal system error handler 123 at a container host (e.g., fatal system error handler 123a at container host 101a) and a second (e.g., one or more of act 406 to act 408) performed by container host failure handler 125 at the control plane 102.

Referring initially to container host 101a (as an example), method 400 comprises an act 401 of detecting a fatal system error. In embodiments, act 401 comprises identifying an occurrence of a fatal system error in connection with the execution of an instruction by the processor system. For example, error detection component 201 at fatal system error handler 123a determines that a processing unit of processor system 112a has encountered a fatal system error.

After act 401, method 400 proceeds to one or more of act 402, act 403, act 404, or act 405. No ordering among these acts is required in FIG. 4, and thus, after act 401, method 400 can proceed to one or more of act 402, act 403, act 404, or act 405 in any serial order or in parallel. In embodiments, method 400 excludes at least one of act 402, act 403, or act 404.

Act 402 includes initiating a single process mode. In embodiments, act 402 comprises, based on identifying the occurrence of the fatal system error, initiating a single process operating mode of the processor system. For example, single process mode component 202 terminates any process managed by OS 119a, except a process corresponding to memory dump component 203. In some embodiments, act 402 also comprises, based on identifying the occurrence of the fatal system error, initiating a single processor operating mode of the processor system. For example, single process mode component 202 freezes all processing units at processor system 112a other than the one that encountered the fatal system error.

Act 403 includes initiating a memory dump. In embodiments, act 403 comprises, based on identifying the occurrence of the fatal system error, initiating writing of a memory dump to persistent storage. For example, memory dump component 203 initiates the writing of a dump of contents of memory 113a to storage medium 114a.

If present, act 404 includes initiating container isolation. In embodiments, act 404 comprises, based on identifying the occurrence of the fatal system error, initiating network isolation of an instance of a container that is provisioned at the computer system. For example, if present, container isolation component 204 of fatal system error handler 123a takes one or more actions to prevent the egress of network activity by container instance 120a (e.g., corresponding to container 122a) from network interface 115a. In embodiments, act 404 comprises container isolation component 204 delaying the initiating writing (e.g., by event writer component 205) of an event (e.g., event 124a) to a management system log (e.g., log 117a) until in-flight network activity has drained from a network interface (e.g., network interface 115a). Additionally, or alternatively, in embodiments, act 404 comprises container isolation component 204 canceling in-flight network activity (e.g., by container instance 120*a*) at a network interface (e.g., network interface 115*a*). Additionally, or alternatively, in embodiments, act 404 comprises container isolation component 204 disabling a network interface (e.g., network interface 115*a*).

Method 400 also comprises an act 405 of writing an event to a management system log. In embodiments, act 405 comprises, based on identifying the occurrence of the fatal system error, initiating writing of an event to a management system log. For example, event writer component 205 writes event 124*a* to log 117*a*. In some embodiments, initiating writing of the event to the management system log comprises communicating (e.g., via IPMI) the event to a BMC.

As shown, after act 405, control proceeds to an act 406 at control plane 102. Thus, referring now to control plane 102, method 400 also comprises act 406 of identifying the event in the management system log. In embodiments, act 406 comprises identifying an event from a management system log associated with a first container host, wherein the presence of the event in the management system log is indicative that the first container host identified a fatal system error at the first container host. For example, log monitoring component 301 identifies event 124*a* in log 117*a* (e.g., a BMC log), which is indicative that fatal system error handler 123*a* has identified a fatal system error at container host 101*a*.

In embodiments, if fatal system error handler 123 is structured such that act 402 occurs prior to act 405, the presence of the event in the management system log is also indicative of one or more of that the first container host initiated a single processor operating mode or that the first container host initiated a single process operating mode. In embodiments, if fatal system error handler 123 is structured such that act 403 is initiated prior to act 405, the presence of the event in the management system log is also indicative that the first container host initiated the writing of a memory dump to persistent storage. In embodiments, if fatal system error handler 123 is structured such that act 404 is present and occurs prior to act 405, the presence of the event in the management system log is also indicative that the first container host isolated the first instance of the container to the first container host.

Method 400 also comprises an act 407 of ensuring container isolation. In embodiments, act 407 comprises determining that a first instance of a container that is provisioned at the first container host has been isolated to the first container host. In some embodiments, act 407 comprises actually isolating a first instance of a container that is provisioned at the first container host. For example, container isolation component 303 determines if container instance 120*a* has been isolated to container host 101*a*, which can include taking proactive action to isolate container instance 120*a* container host 101*a*.

For example, in embodiments in which method 400 included act 404 (e.g., in which the container host 101*a* initiated container isolation), determining that the first instance of the container has been isolated to the first container host in act 407 is based on the presence of the event in the management system log. In embodiments, the first container host isolated the first instance of the container to the first container host by one or more of delaying writing the event to the management system log until in-flight network activity has drained from a network interface, canceling in-flight network activity at the network interface, or disabling the network interface.

In some embodiments, determining that the first instance of the container has been isolated to the first container host in act 407 comprises determining that a network interface at the first container host has been isolated. In embodiments, the network interface at the first container host is isolated based on one or more of disabling a network switch port or disabling the network interface at the first container host. In some embodiments, act 407 comprises container isolation component 303 isolating a network interface at the first container host based on one or more of disabling a network switch port or disabling the network interface at the first container host. (e.g., based on interfacing with a switch of network 104 or with a smart network interface card).

In some embodiments, determining that the first instance of the container has been isolated to the first container host in act 407 comprises determining that a network state associated with the first container host has been terminated. In some embodiments, act 407 comprises container isolation component 303 terminating a network state associated with the first container host (e.g., based on interfacing with a firewall of network 104).

Method 400 also comprises an act 408 of healing a container. In embodiments, act 408 comprises instructing a second container host to provision a second instance of the container at the second container host. For example, container migration component 304 provisions an instance of container 122*a* at container host 101*n*.

Embodiments of the disclosure comprise or utilize a special-purpose or general-purpose computer system (e.g., container host 101*a*, container host 101*n*, control plane 102) that includes computer hardware, such as, for example, a processor system (e.g., processor system 112*a*, 112*n*, 106) and system memory (e.g., memory 113*a*, 113*n*, 107), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 114*a*, 114*n*, 109). Computer-readable media that carry computer-executable instructions and/or data structures are transmission media. Thus, embodiments of the disclosure can comprise at least two distinctly different kinds of computer-readable media: computer storage media and transmission media. A computer storage medium is not a transmission medium, and a computer storage medium thus excludes transitory signals.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 115a, 115n, 110) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more CPUs, one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more VMs. During operation, VMs emulate an operational computing system, supporting an OS and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented on a computer system that includes a processor system, comprising:
   identifying an event from a management system log associated with a first container host, wherein presence of the event in the management system log is indicative that the first container host identified a fatal system error at the first container host;
   determining that a first instance of a container that is provisioned at the first container host has been isolated to the first container host, including at least one of,
      determining that a network interface at the first container host has been isolated; or
      determining that a network state associated with the first container host has been terminated; and
   instructing a second container host to provision a second instance of the container at the second container host.

2. The method of claim 1, wherein,
   the presence of the event in the management system log is also indicative that the first container host isolated the first instance of the container to the first container host, and determining that the first instance of the container has been isolated to the first container host is based on the presence of the event in the management system log.

3. The method of claim 2, wherein the first container host isolates the first instance of the container to the first container host by delaying writing the event to the management system log until in-flight network activity has drained from a network interface.

4. The method of claim 2, wherein the first container host isolates the first instance of the container to the first container host by canceling in-flight network activity at a network interface.

5. The method of claim 1, wherein,
the method includes determining that a network interface at the first container host has been isolated; and
the network interface at the first container host is isolated based on disabling a network switch port.

6. The method of claim 1, wherein,
the method includes determining that a network interface at the first container host has been isolated; and
the network interface at the first container host is isolated based on disabling the network interface at the first container host.

7. The method of claim 1, wherein the presence of the event in the management system log is also indicative that the first container host initiated writing of a memory dump to persistent storage.

8. The method of claim 1, wherein the presence of the event in the management system log is also indicative that the first container host initiated a single processor operating mode.

9. The method of claim 1, wherein the presence of the event in the management system log is also indicative that the first container host initiated a single process operating mode.

10. The method of claim 1, wherein the management system log is a baseboard management controller log.

11. A computer system, comprising: a processor system; and a computer storage medium that stores computer-executable instructions that are executable by the processor system to at least:
identify an event from a management system log associated with a first container host, wherein presence of the event in the management system log is indicative that the first container host identified a fatal system error at the first container host;
isolate a first instance of a container that is provisioned at the first container host, including at least one of,
isolating a network interface at the first container host based on disabling a network switch port;
isolating the network interface at the first container host based on disabling the network interface at the first container host; or
terminating a network state associated with the first container host; and
instruct a second container host to provision a second instance of the container at the second container host.

12. The computer system of claim 11, wherein,
the presence of the event in the management system log is also indicative that the first container host isolated the first instance of the container to the first container host, and
determining that the first instance of the container has been isolated to the first container host is based on the presence of the event in the management system log.

13. The computer system of claim 12, wherein the first container host isolates the first instance of the container to the first container host by delaying writing the event to the management system log until in-flight network activity has drained from a network interface.

14. The computer system of claim 12, wherein the first container host isolates the first instance of the container to the first container host by canceling in-flight network activity at a network interface.

15. The computer system of claim 11, wherein the presence of the event in the management system log is also indicative of at least one of,
that the first container host initiated writing of a memory dump to persistent storage;
that the first container host initiated a single processor operating mode; or
that the first container host initiated a single process operating mode.

16. The computer system of claim 11, wherein the management system log is a baseboard management controller log.

17. A method implemented on a computer system that includes a processor system, comprising:
identifying an occurrence of a fatal system error in connection with execution of an instruction by the processor system; and
based on identifying the occurrence of the fatal system error:
initiating network isolation of an instance of a container that is provisioned at the computer system, including at least one of:
delaying initiating writing of an event to a management system log until in-flight network activity has drained from a network interface; or
canceling in-flight network activity at a network interface;
initiating writing of a memory dump to persistent storage; and
initiating writing of an event to a management system log.

18. The method of claim 17, wherein the method further comprises initiating a single processor operating mode of the processor system based on identifying the occurrence of the fatal system error.

19. The method of claim 17, wherein the method further comprises initiating a single process operating mode of the processor system based on identifying the occurrence of the fatal system error.

20. The method of claim 17, wherein initiating writing of the event to the management system log comprises communicating the event to a baseboard management controller.

* * * * *